United States Patent
Kang et al.

(10) Patent No.: US 11,840,406 B1
(45) Date of Patent: Dec. 12, 2023

(54) NON-PLC-BASED CONVEYOR CONTROLLER

(71) Applicant: FabTech System CO., LTD., Hwaseong-si (KR)

(72) Inventors: Hyo Muk Kang, Hwaseong-si (KR); Gi Byoung Ku, Hwaseong-si (KR)

(73) Assignee: FabTech System CO., LTD., Hwaseong-si (KR)

( * ) Notice: Subject to any disclaimer, the term of this patent is extended or adjusted under 35 U.S.C. 154(b) by 0 days.

(21) Appl. No.: 18/321,630

(22) Filed: May 22, 2023

(30) Foreign Application Priority Data

May 27, 2022 (KR) .......................... 10-2022-0065059

(51) Int. Cl.
*B65G 43/08* (2006.01)
*G05B 19/416* (2006.01)
(Continued)

(52) U.S. Cl.
CPC ........... *B65G 43/08* (2013.01); *B65G 37/005* (2013.01); *B65G 43/10* (2013.01); *G05B 19/416* (2013.01); *G05B 2219/45054* (2013.01)

(58) Field of Classification Search
CPC ..... B65G 43/08; B65G 43/10; G05B 19/0426
See application file for complete search history.

(56) References Cited

U.S. PATENT DOCUMENTS

| 11,358,803 B2 * | 6/2022 | Henze | ..................... B65G 43/08 |
| 2003/0034229 A1 * | 2/2003 | Fishaw | ................ B65G 47/261 198/781.06 |

(Continued)

FOREIGN PATENT DOCUMENTS

| CN | 111919180 A | 11/2020 |
| JP | H06-127659 A | 5/1994 |

(Continued)

OTHER PUBLICATIONS

"Written Decision on Registration" Office Action issued in KR 10-2022-0065059; mailed by the Korean Intellectual Property Office dated Mar. 6, 2023.

*Primary Examiner* — Timothy R Waggoner
(74) *Attorney, Agent, or Firm* — Studebaker & Brackett PC (57) ABSTRACT

Disclosed is a non-PLC-based conveyor controller that controls object transport on a conveyor through communication between controllers with embedded software includes a first controller-connector that performs transmission/reception of data and operation signals with a left non-PLC-based conveyor controller, a second controller-connector that performs transmission/reception of data and operation signals with a right non-PLC-based conveyor controller, an input section through which an object detection signal from a sensor for an object transported on the conveyor is input, an output section that outputs a motor driving signal for operating the conveyor, and a control section that when the object detection signal is input, transmits an entry prohibition signal to the right controller through the first controller-connector, transmits a progress signal to the right controller through the second controller-connector, and outputs the motor driving signal through the output section so that the object is transported to the conveyor controlled by the right controller.

6 Claims, 5 Drawing Sheets

(51) Int. Cl.
*B65G 37/00* (2006.01)
*B65G 43/10* (2006.01)

(56) References Cited

U.S. PATENT DOCUMENTS

| | | | |
|---|---|---|---|
| 2012/0290126 A1* | 11/2012 | Combs | B65G 23/08 |
| | | | 700/230 |
| 2014/0277698 A1* | 9/2014 | Combs | G05B 19/4189 |
| | | | 198/460.1 |
| 2018/0004991 A1 | 1/2018 | Jacobsen | |

FOREIGN PATENT DOCUMENTS

| | | |
|---|---|---|
| JP | 2018-043853 A | 3/2018 |
| KR | 10-1999-0057197 A | 7/1999 |
| KR | 10-2006-0002009 A | 1/2006 |
| KR | 10-0960145 B1 | 5/2010 |
| KR | 10-1003279 B1 | 12/2010 |

* cited by examiner

NON-PLC-BASED CONVEYOR CONTROLLER

CROSS-REFERENCE TO RELATED APPLICATIONS

This application claims the priority of Korean Patent Application No. 10-2022-0065059 filed on May 27, 2022, in the Korean Intellectual Property Office, the disclosure of which is incorporated herein by reference.

BACKGROUND OF THE INVENTION

Field of the Invention

The present invention relates to a conveyor controller, and more particularly, to a non-PLC-based conveyor controller with embedded software installed therein, capable of controlling a conveyor system by itself without control through a central PLC (programmable logic controller).

Description of the Related Art

A conveyor is an apparatus that transports products, raw materials, or the like from one place to another by power. Such a conveyor is used throughout industries requiring transport of logistics, such as manufacturing factories or distribution companies. The conveyor includes a driving device, a transport device including a belt or a chain, a control device, a support, and the like. Conveyors with a considerably long length are installed in a complex logistics center, and in this case, an efficient operating system is necessary not only for driving and controlling the large conveyors, but also for equipment maintenance.

Korean Patent No. 10-1003279 (Apparatus and method for controlling conveyor) discloses an apparatus and a method for controlling a conveyor on the basis of the length of a product, including a first conveyor and a second conveyor that transport a product transported from an inspection table to a run-out roller table, a first detector that detects the product on an exit side of the first conveyor, a second detector that detects the product on an exit side of the second conveyor, an input section through which the length of the product is input, and a controller that generates a control signal for controlling transport of the product of the first conveyor and the second conveyor on the basis of detection signals of the first detector and the second detector and the length of the product input through the input section, in which in a case where the first detector detects a product having a medium length, the controller generates a control signal for stopping the transport of the product on the first conveyor and the second conveyor.

Since such a conventional conveyor controller undergoes many stages of installation, I/O connection, connection of I/O and main PLC, I/O test, PLC development, and test run, the cost increases at the time of introduction, and the process after installation becomes long.

Further, due to separate installation (motor driver and optical sensor) of conveyor controllers, materials and installation costs for two controllers become high, and a wiring for each I/O connection should be connected to the main PLC. In addition, in a case where an error occurs in each I/O, the process of the entire line stops, and accordingly, the transport stops. However, since there is no display device that can easily recognize the I/O error, an operator should check the cause of the problem one by one, which consumes a lot of time.

Further, in a case where a trouble occurs in the PLC, the entire line stops due to the centralization of the PLC, and a new PLC program and control system should be established in case of change or transfer after initial installation.

In this way, since the conventional conveyor control apparatus is configured so that a controller PLC for controlling each controller controls all the controllers from the center, in a case where a trouble occurs in the controller PLC, or in a case where the structure of the conveyor apparatus is changed or transferred, the operation of the entire conveyor system should be stopped, and the program of the controller PLC needs to be changed.

SUMMARY OF THE INVENTION

The present invention has been made in view of the above problems, and an object of the present invention is to provide a non-PLC-based conveyor controller that checks a position of an object being transported on a conveyor and controls the transport through communication between controllers installed with embedded software, instead of a central PLC-based control method.

Further, another object of the present invention is to provide a non-PLC-based conveyor controller that automatically transports an object through communication with front and rear controllers by simply connecting the controllers to enable communication between the controllers, in installation or change of a conveyor system.

In accordance with the present invention, the above and other objects can be accomplished by the provision of a non-PLC-based conveyor controller configured so that a plurality of the non-PLC-based conveyor controllers are connected in series to enable signal transmission between the controllers, including a first controller connector that performs transmission and reception of data and an operation signal with respect to a non-PLC-based conveyor controller on the left side, a second controller connector that performs transmission and reception of data and an operation signal with respect to a non-PLC-based conveyor controller on the right side, an input section through which an object detection signal for an object transported on a conveyor is input from a sensor, an output section that outputs a motor driving signal for operating the conveyor, and a control section that in a case where the object detection signal is input through the input section, transmits an entry prohibition signal to the non-PLC-based conveyor controller on the right side through the first controller connector, transmits a progress signal to the non-PLC-based conveyor controller on the right side through the second controller connector, and outputs the motor driving signal through the output section so that the object is transported to the conveyor controlled by the non-PLC-based conveyor controller on the right side.

In a case where the input of the object detection signal through the input section is stopped, the control section may determine that the last part of the object has passed, output the motor driving signal through the output section for a predetermined time (T) so that the object passes the last point of the conveyor controlled by the control section to be transported to the conveyor controlled by the non-PLC-based conveyor controller on the right side, and stop the output of the motor driving signal in a case where the predetermined time (T) elapses.

The predetermined time (T) may be calculated using a distance (S) from a position where the last part of the object passes to the last point of the conveyor controlled by the control section and a rotational speed (V) of the motor that is rotated according to the motor driving signal.

Further, in a case where the output of the motor driving signal is stopped after the predetermined time (T) elapses, the control section may transmit the progress signal to the non-PLC-based conveyor controller on the left side through the first controller connector, and in a case where the progress signal is received from the non-PLC-based conveyor controller on the left side, the control section may output the motor driving signal through the output section.

The non-PLC-based conveyor controller further includes an internal communication section that transmits an error and an operation log generated in the non-PLC-based conveyor controller, and in a case where the object detection signal is not received through the input section within a specified time after the progress signal is received from the non-PLC-based conveyor controller on the left side through the first controller connector, the control section transmits an error message including a serial number of the control section and a serial number of the controller that has transmitted the progress signal to the server through the internal communication section.

Specifically, in a case where the object detection signal is continuously received for an object detection time corresponding to the maximum object length or longer through the input section after the progress signal is received from the first non-PLC-based conveyor controller on the left side through the first controller connector, or in a case where there is no output of the motor driving signal through the output section even after the detection time corresponding to the maximum object length elapses, the control section may transmit a motor error message including its own serial number to the server through the internal communication section.

Further, the non-PLC-based conveyor controller further includes a setting section that sets a serial number of each non-PLC-based conveyor controller, sets a movement direction of whether the controller moves the object to the left or right, and sets which one of a starting position, a middle position, and the last position of the plurality of controllers the position of the controller corresponds to. In a case where the control section corresponds to the last controller through the settings of the setting section, and in a case where the object detection signal is received through the input section, the control section may stop the output of the motor driving signal, and transmit the entry prohibition signal to the non PLC-based conveyor controller on the left side. Further, in a case where the control section corresponds to the middle controller through the settings of the setting section, in a case where the entry prohibition signal is received from the last controller, and in a case where the object detection signal is received through the input section, the control section may stop the output of the motor driving signal, and transmit the entry prohibition signal to the non-PLC-based conveyor controller on the left side.

According to the present invention, in installation a conveyor system or change thereof, since controllers with embedded software therein are connected with each other and automatic communication is performed between front and rear controllers to control operation of conveyors, without changing a central controller PLC program and stopping an entire operation of the conveyor system, it is possible to easily operate the conveyor system and flexibly change and expand the configuration of the conveyor system to suit field situations.

Further, since there is no need to stop the entire operation of the system in installation or change of the conveyor system, it is possible to improve productivity and reduce facility investment costs.

In addition, by collecting and delivering information on an overall operation status and malfunction errors to a manager, it is possible to enable prompt response to troubles that occur in the field, thereby preventing safety accidents.

Furthermore, it is possible to reduce cost necessary for introduction of a PLC only by replacing a motor controller for conveyor operation.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Advantages, features of the present invention, and methods for achieving them will be apparent with reference to embodiments to be described in detail hereinafter with reference to the accompanying drawings.

However, the present invention is not limited to the embodiments disclosed below, and may be implemented in various different forms.

The embodiments in this specification are provided to adequately disclose the present invention, and to adequately inform those skilled in the art of the scope of the invention to which the present invention belongs.

The present invention is only defined by claims.

In some embodiments, well-known components, operations and techniques will not be described in detail in order to avoid obscuring interpretation of the present invention.

Throughout the specification, the same reference numerals represent the same components, and terms used in this specification are for describing embodiments and are not intended to limit the present invention.

In this specification, the singular also includes the plural unless specifically stated in phrases, and components and operations referred to as "comprising (or including)" do not exclude the presence or addition of one or more other components and operations.

Unless otherwise defined, all terms (including technical and scientific terms) used in this specification may be used in meanings commonly understood by those of ordinary skill in the art to which the present invention belongs.

In addition, terms defined in commonly used dictionaries are not interpreted ideally or excessively unless they are defined.

Hereinafter, preferred embodiments of the present invention will be described with reference to the accompanying drawings.

Figure 1:
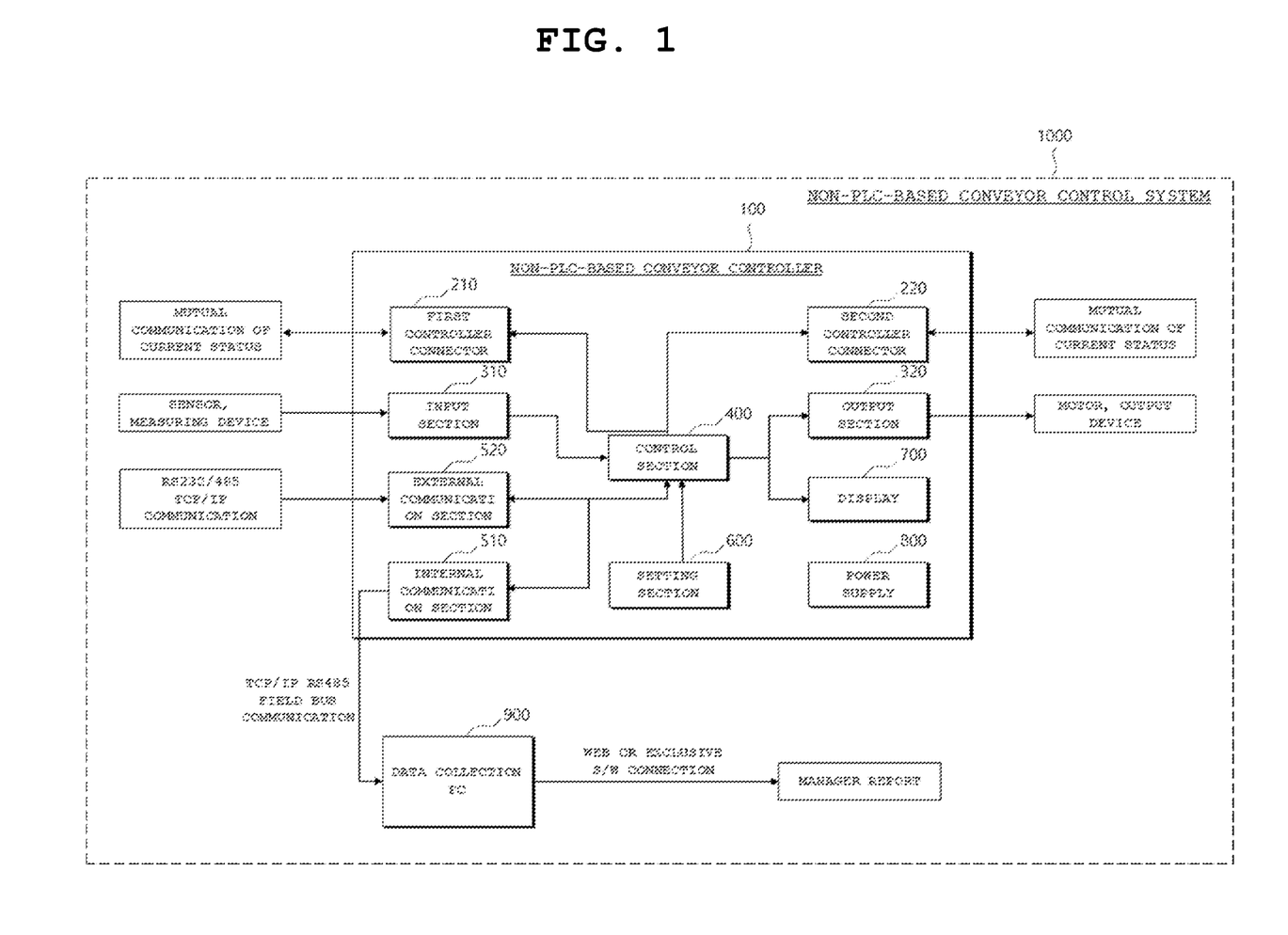
FIG. 1 is a diagram showing a configuration of a conveyor control system including a non-PLC-based conveyor controller according to an embodiment of the present invention.

FIG. 1 is a diagram showing a configuration of a non-PLC-based conveyor control system 1000 including a non-PLC-based conveyor controller 100 according to an embodiment of the present invention.

The non-PLC-based conveyor control system 1000 includes the non-PLC-based conveyor controller 100 and a data collection PC 900.

A plurality of the non-PLC-based conveyor controllers 100 are serially connected to each other, so that signals can be transmitted between the controllers. That is, object transport and conveyor control are performed through mutual communication between the controllers 100 without using a central controller PLC that controls plural controllers.

Figure 2:
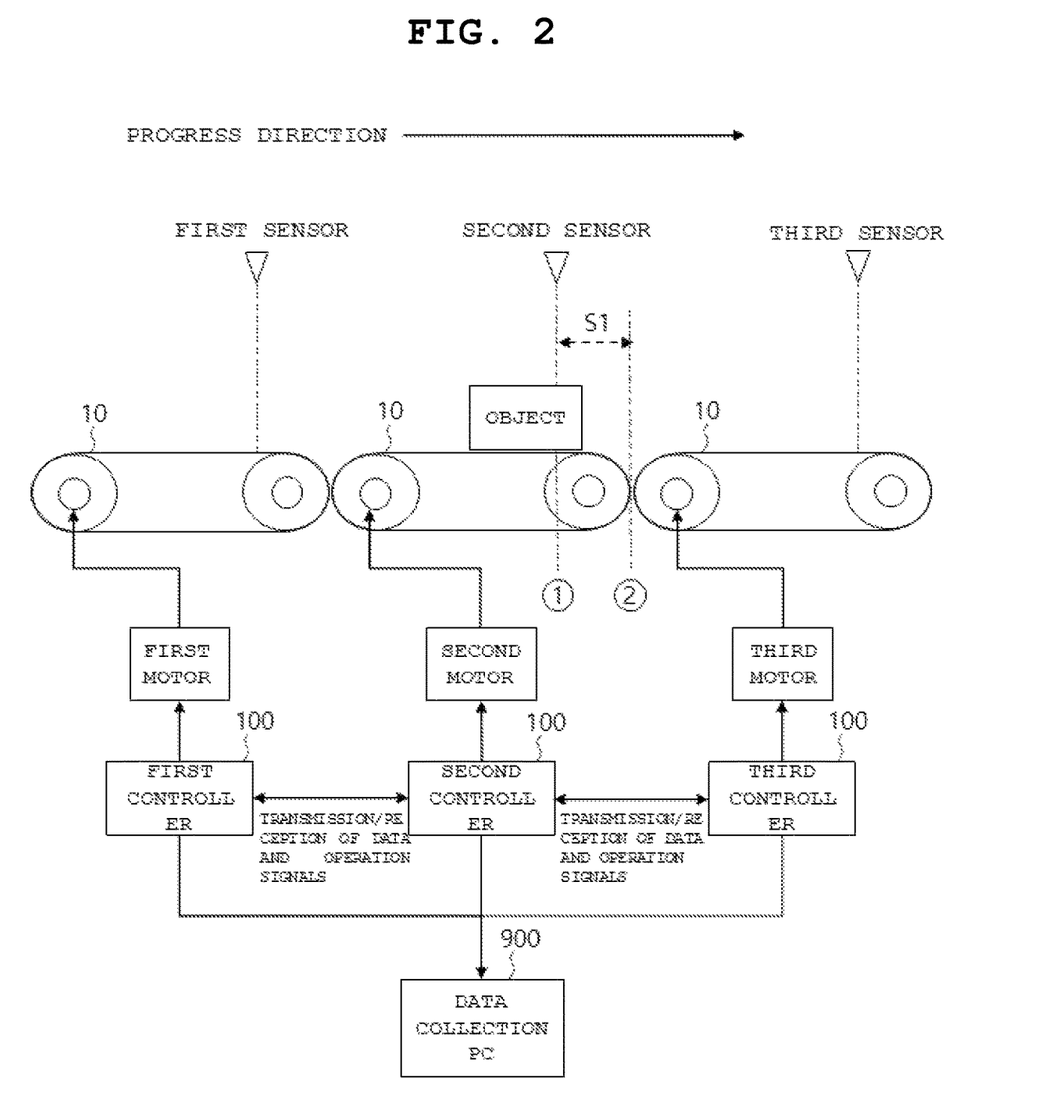
FIG. 2 is an exemplary diagram for illustrating a control mechanism between first to third controllers when an object passes on a conveyor controlled by the second controller, according to an embodiment of the present invention.

Referring to FIG. 2, an object is transported from left to right, a second controller 100 that controls a central conveyor 10 is connected to a first controller 100 that controls a left conveyor 10 to transmit and receive data and an operation signal, and is connected to a third controller 100 that controls a right conveyor 10 to transmit and receive data and an operation signal, thereby controlling transport of the object and operation of the conveyors 10 only through mutual communication between the first, second and third controllers.

The non-PLC-based conveyor controller 100 includes a first controller connector 210, a second controller connector 220, an input section 310, an output section 320, a control section 400, and a power supply 800, and may further include an internal communication section 510, an external communication section 520, a setting section 600, and a display 700.

The first controller connector 210 performs transmission and reception of data and operation signals with respect to the first non-PLC-based conveyor controller 100 on the left side. Referring to FIG. 2, for ease of description, it is assumed that an object is transported from left to right.

The second controller connector 220 performs transmission and reception of data and operation signals with respect to the third non-PLC-based conveyor controller 100 on the right side. Here, the data includes, for example, a status message including a controller serial number received from the controllers 100 connected to the left and right sides.

In FIG. 2, it is assumed that the conveyor 10 controlled by the first controller 100 through a first motor is a first conveyor, and the conveyor 10 controlled by the third controller 100 through a third motor is a third (last) conveyor. The first controller 100 receives a status message including a controller serial number from the second controller 100 connected on the right side, determines that the object needs to be transported to the right side, and controls an operation. In a case where the second controller 100 receives a status message including a controller serial number from the first controller 100 connected on the left side and receives a status message including a controller serial number from the third controller 100 connected on the right, the second controller 100 determines that the object needs to be transported from left to right, and controls an operation. In a case where the third controller 100 receives the status message including the controller serial number from the second controller 100 connected on the left side, the third controller 300 determines that further transport of the object should stop since its own serial number corresponds to the last number. Since the serial numbers of the first, second and third controllers 100 increase in the transport direction, each controller can recognize in which direction the object should be transported and whether it is the first controller or the last controller.

The operation signal includes an entry prohibition signal and a progress signal transmitted or received between the controllers 100. The operation signal will be described in detail below.

The input section 310 receives input of an object detection signal for an object transported on the conveyor 10 from a sensor. Referring to FIG. 2, first to third sensors are provided for the conveyors 10, respectively, and are provided as optical sensors for detecting the movement of the object.

The output section 320 outputs a motor driving signal for operating the conveyor 10. In FIG. 2, the output section 320 of the first controller 100 outputs the motor driving signal to a first motor to control an operation of the conveyor 10, the output section 320 of the second controller 100 outputs the motor driving signal to a second motor to control an operation of the conveyor 10, and the output section 320 of the third controller 100 outputs the motor driving signal to a third motor to control an operation of the conveyor 10. Each of the first to third controllers 100 independently controls the conveyor 10. In the present embodiment, a belt conveyor is shown as the conveyor 10, but the present invention is not limited thereto, and various types of conveyors such as a roller conveyor or an apron conveyor may be controlled in a similar way.

In a case where an object detection signal is received through the input section 310, the control section 400 transmits an entry prohibition signal to the non-PLC-based conveyor controller 100 on the left side through the first controller connector 210, transmits a progress signal to the non-PLC-based conveyor controller 100 on the right side through the second controller connector 220, and outputs a motor driving signal through the output section 320 so that the object is transported to the conveyor controlled by the non-PLC-based conveyor controller on the right side. In FIG. 2, in a case where an object detection signal is received from the conveyor 10 controlled by the second controller, the control section 400 transmits the entry prohibition signal to the first controller 100 on the left side, and transmits the progress signal to the third controller 100 on the right side. In a case where the progress signal is received, the third controller 100 on the right side outputs the motor driving signal through the output section 320 until the object arrives at the position of the third sensor.

In a case where the control section 400 belongs to the first controller 100, the control section 400 does not transmit the entry prohibition signal since there is no target of the transmission of the entry prohibition signal, and in a case where the control section 400 belongs to the last controller 100, the control section 400 does not transmit the progress signal since there is no target of the transmission of the progress signal.

In a case where the input of the object detection signal through the input section 310 is stopped, the control section 400 determines that the last part of the object has passed, outputs the motor driving signal through the output section 320 for a predetermined time (T) so that the object passes the last point of the conveyor 10 controlled by the control section 400 to be transported to the conveyor 10 controlled by the non-PLC-based conveyor controller 100 on the right side, and stops the output of the motor driving signal after the predetermined time (T) elapses.

Referring to FIG. 2, the object is passing the conveyor controlled by the second controller 100, and the object is continuously detected by the second sensor. In a case where the object further moves and the object detection by the second sensor is completed, the reception of the object detection signal through the input section 310 is stopped. The distance from the point ① at which the object is no longer detected by the second sensor to the last point ② of the conveyor 10 controlled by the second sensor corresponds to S1. In a case where the reception of the object detection signal through the input section 310 is stopped, the control section 400 outputs the motor driving signal for the predetermined time (T) so that the object moves by the distance S1 to the last point of the conveyor 10 to be transported to the conveyor 10 controlled by the third non-PLC-based conveyor controller 100 on the right side, and stops the output of the motor driving signal after the predetermined time (T) elapses.

Here, the predetermined time (T) is calculated on the basis of a distance (S) (S1 in FIG. 2) from a position where the last part of the object passes to the last point of the conveyor controlled by the control section and a rotational speed (V) of the motor that is rotated according to the motor driving signal. The rotational speed (V) of the motor may be set variously as necessary, and the predetermined time (T) for the output of the motor driving signal varies according to the rotational speed (V) of the motor and the distance (S).

Figure 3:
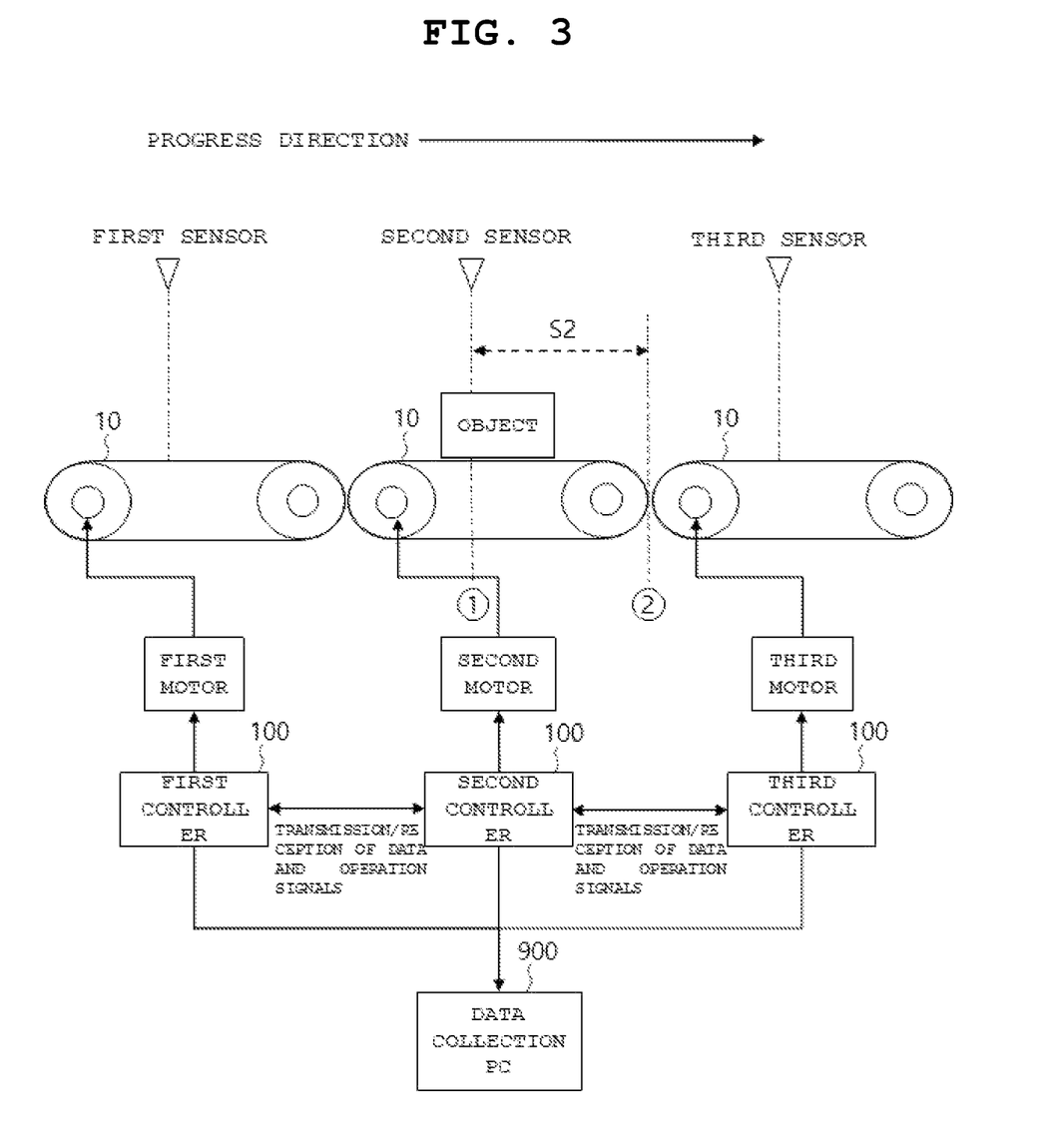
FIG. 3 is an exemplary diagram for illustrating a case where first to third sensors in FIG. 2 are moved.

Referring to FIG. 3, it can be seen that the positions of the first to third sensors on the right in FIG. 2 have moved to the left. The sensors that detect objects may be mounted in various positions according to sizes and characteristics of the objects transported on the conveyors. Information on positions where the sensors are mounted may be input by a conveyor manager through the setting section 600, or may be set by a program of embedded software of the controller. The above-mentioned values may be modified. For example, in FIG. 3, the length of S2 is longer than that of S1 in FIG. 2. In the case of a small object, as shown in FIG. 2, it is preferable to set the positions of the sensors so that the distance ② from the position ① where the last part of the object passes to the last point of the conveyor controlled by the control section is about S1, and in the case of a long and large object, as shown in FIG. 3, it is preferable to set the positions of the sensors so that the distance ② from the position ① where the last part of the object passes to the last point of the conveyor controlled by the control section is about S2.

Figure 4:
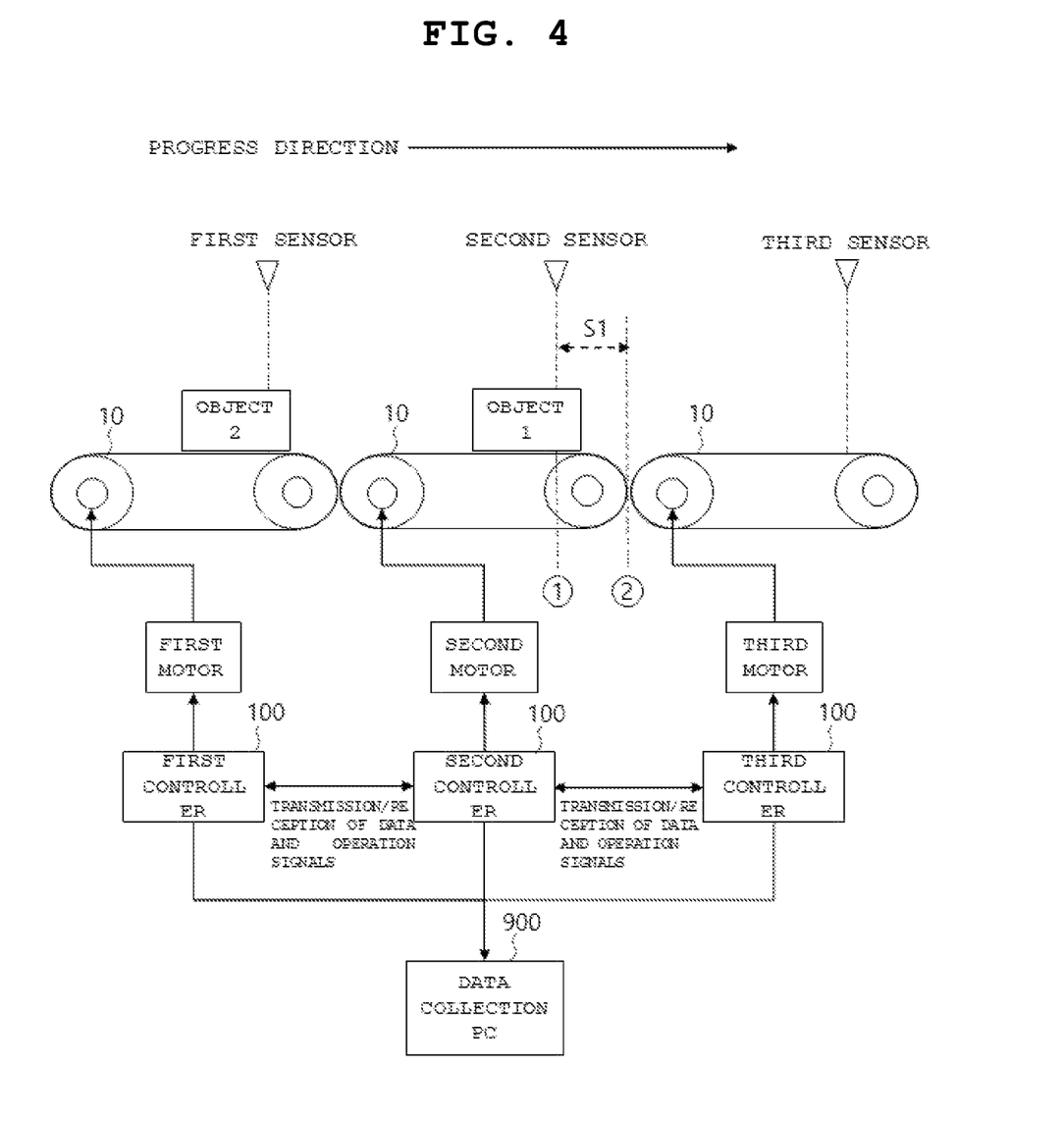
FIG. 4 is an exemplary diagram for illustrating a control mechanism between the first to third controllers when an object 1 passes on the conveyor controlled by the controller 2 and an object 2 passes on a conveyor controlled by the controller 1, according to an embodiment of the present invention.

In a case where the output of the motor driving signal is stopped after the predetermined time (T) elapses, the control section 400 transmits the progress signal to the first non-PLC-based conveyor controller 100 on the left side through the first controller connector 210, and in a case where the progress signal is received from the first non-PLC-based conveyor controller 100 on the left side, the control section 400 outputs the motor driving signal through the output section 320. In FIG. 4, in a case where the output of the motor driving signal output by the second controller 100 is stopped after the predetermined time (T) elapses and the object passes to the conveyor 10 on the right side controlled by the third controller 100, the control section 400 transmits the progress signal to the first controller 100 on the left side. In a case where the progress signal is received, the first controller 100 on the left side outputs the motor driving signal through the output section 320 to continue transporting another object.

The internal communication section 510 transmits an error and an operation log generated in the non-PLC-based conveyor controller 100 to a server. The server refers to the data collection PC 900.

In a case where the object detection signal is not received through the input section 310 within a specified time after the progress signal is received from the first non-PLC-based conveyor controller 100 on the left side through the first controller connector 210, the control section 400 transmits an error message including a serial number of the second controller and a serial number of the first controller that has transmitted the progress signal to the server 900 through the internal communication section 510. After the object transported on the conveyor controlled by the second controller passes to the conveyor controlled by the third controller, in a case where the object does not arrive within the specified time and the object detection signal is not received through the input section 310 although the first controller receives the progress signal and the second controller drives the second motor, it is determined that a trouble has occurred in the second controller or in the first controller that has transmitted the progress signal, and accordingly, the control section 400 transmits an error message to the server 900 to report the situation to the manager.

In a case where the object detection signal is continuously received for an object detection time corresponding to the maximum object length or longer through the input section 310 after the progress signal is received from the first non-PLC-based conveyor controller 100 on the left side through the first controller connector 210, or in a case where there is no output of the motor driving signal through the output section 320 even after the detection time corresponding to the maximum object length has elapsed, the control section 400 transmits a motor error message including its own serial number to the server 900 through the internal communication section 510.

The maximum object length may be set through a program of the embedded software, or may be inputted by the conveyor manager through the setting section 600. In a case where the object detection signal is continuously received for the detection time corresponding to the maximum object length or longer, it is determined that the motor is not driven properly, and the object is not normally transported and is stopped. After the detection time corresponding to the maximum object length has elapsed, the motor driving signal should be output through the output section 320 so that the object passes through the last point of the conveyor controlled by the control section and is transported to the conveyor controlled by the right controller, but in a case where there is no output of the motor driving signal through the output section 320, it is determined that the object is not normally transported and is stopped, and thus, the last part of the object has not yet passed through the sensor. In this case, it is determined that the motor is not driven normally and the transport of the object is stopped.

The setting section 600 sets the serial number of the non-PLC-based conveyor controller 100, sets a movement direction of whether the controller 100 moves the object to the left or the right, and sets which one of the starting position, the middle position and the last position of the plurality of controllers the position of the corresponding controller 100 corresponds to. The serial number of the controller 100 may be input by manipulating a dip switch of the device. In a case where the serial number is set, using a status message including the serial number received in data transmission between the controllers 100, the transport direction of the object is set, and the position of the controller, that is, the first starting position, the middle position or the last position is set. Since the method for determining the transport direction of the object and the position (starting, middle, or last position) of the controller using the status message including the serial number has been described above, repetitive description thereof will be omitted.

Figure 5:
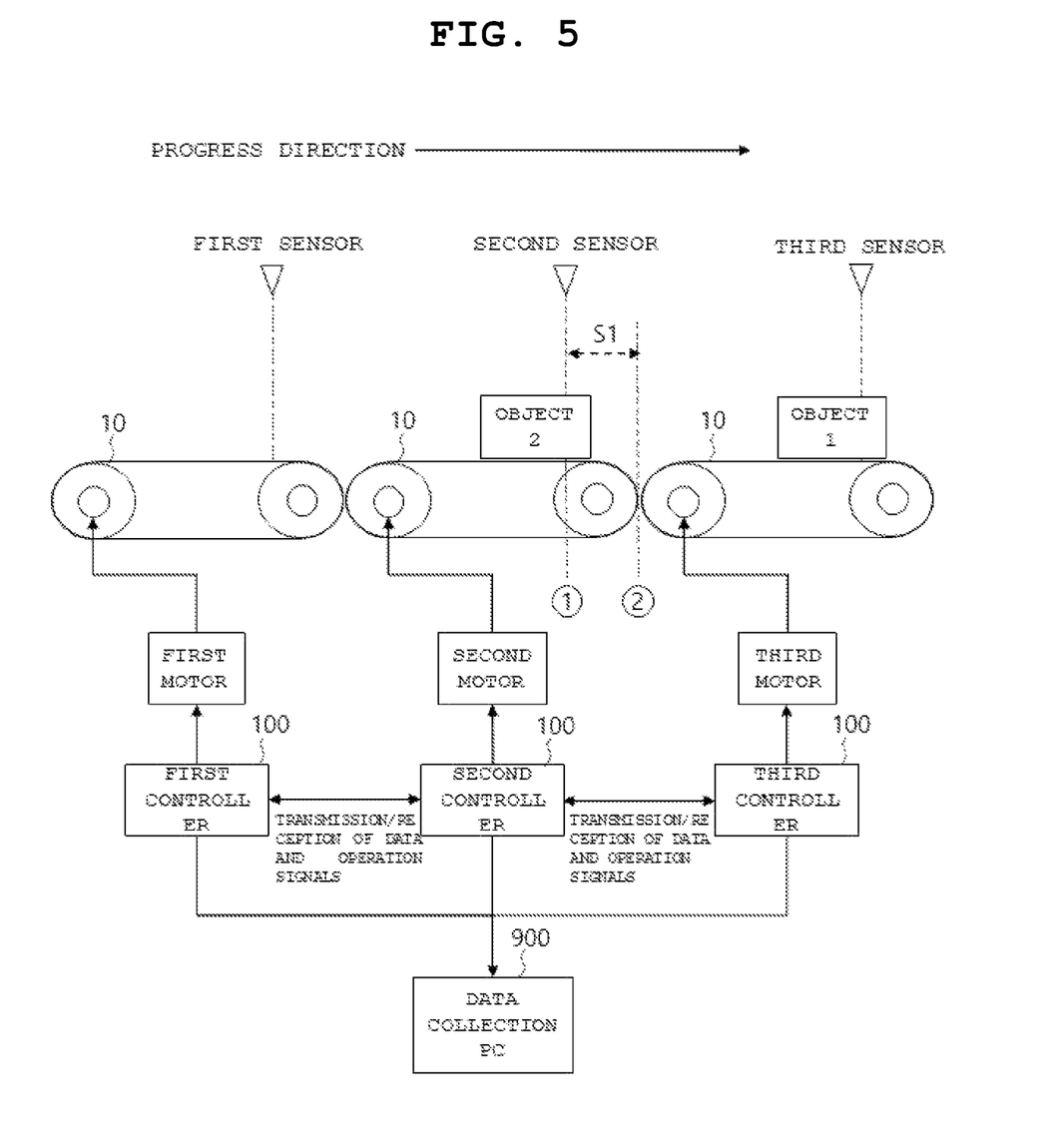
FIG. 5 is an exemplary diagram for illustrating a control mechanism between the first to third controllers when the object 1 arrives at a conveyor controlled by the controller 3 and the object 2 passes on the conveyor controlled by the controller 1, according to an embodiment of the present invention.

Referring to FIG. 5, in a case where the control section 400 of the third controller 100 is the last controller 100 through setting of the setting section 600, and in a case where the object detection signal is received through the input section 310, the control section 400 stops the output of the signal, and transmits the entry prohibition signal to the second non-PLC-based conveyor controller 100 on the left.

In a case where the control section 400 of the second controller 100 is the middle controller 100 through setting, and in a case where the entry prohibition signal is received from the last controller 100, the control section 400 stops the output of the motor driving signal, and transmits the entry prohibition signal to the first non-PLC-based conveyor controller 100 on the left.

In a case where the first controller 100 on the left side receives the entry prohibition signal from the second controller 100 on the right side, although the object detection signal is received through the input section 310, the first controller 100 stops the output of the motor driving signal, so that the device enters a standby state.

The power supply 800 supplies power so that all the components of the controller 100 including the control section 400 can operate, and the external communication section 520 connects to the controller 100 from outside to provide a communication port for checking a memory status, a version status, a setting status, and the like of the controller 100.

The internal communication section 510 is a communication module between the controller 100 and the data collection PC 900, and collects errors and operation logs and transmits the result to the data collection PC 900. The manager may access the data collection PC 900 through the web or exclusive software to check errors and operation logs and to take action for field situations.

The display 700 displays information on the setting status and operation status of the controller 100 so that a worker can directly check the result on the field.

The effects according to the present invention are summarized as follows.

There is no whole shutdown of the controller.

By processing overall data collection (operating status and malfunction error) and transmitting the result to a manager, it is possible to make a quick judgement, to prevent safety accidents, and to increase the operation efficiency.

In a case where a controller is replaced due to a trouble, power only for the controller is cut off for replacement, thereby making it possible to keep operations of the remaining sections.

Flexible expansion and modification is available through communication between controllers without a specific control PLC program.

The cost related to PLC introduction only by replacing the motor controller can be reduced.

The present invention is not limited to the specific preferred embodiments described above, and various modifications can be made by those skilled in the art without departing from the scope of the present invention disclosed in claims.

What is claimed is:

1. A non-PLC-based conveyor controller configured so that a plurality of the non-PLC-based conveyor controllers are connected in series to enable signal transmission between the controllers, comprising:
   a first controller connector that performs transmission and reception of data and an operation signal with respect to a non-PLC-based conveyor controller on a left side;
   a second controller connector that performs transmission and reception of data and an operation signal with respect to a non-PLC-based conveyor controller on a right side;
   an input section through which an object detection signal for an object transported on a conveyor is input from a sensor;
   an output section that outputs a motor driving signal for operating the conveyor;
   a control section that in a case where the object detection signal is input through the input section, transmits an entry prohibition signal to the non-PLC-based conveyor controller on the right side through the first controller connector, transmits a progress signal to the non-PLC-based conveyor controller on the right side through the second controller connector, and outputs the motor driving signal through the output section so that the object is transported to the conveyor controlled by the non-PLC-based conveyor controller on the right side; and
   an internal communication section that transmits an error and an operation log generated in the non-PLC-based conveyor controller, to a server,
   wherein in a case where the object detection signal is not received through the input section within a specified time after the progress signal is received from the non-PLC-based conveyor controller on the left side through the first controller connector, the control section transmits an error message including a serial number of the control section and a serial number of the controller that has transmitted the progress signal to the server through the internal communication section.

2. The conveyor controller according to claim 1,
   wherein in a case where the input of the object detection signal through the input section is stopped, the control section determines that a last part of the object has passed, outputs the motor driving signal through the output section for a predetermined time (T) so that the object passes a last point of the conveyor controlled by the control section to be transported to the conveyor controlled by the non-PLC-based conveyor controller on the right side, and stops the output of the motor driving signal in a case where the predetermined time (T) elapses.

3. The conveyor controller according to claim 2,
   wherein the predetermined time (T) is calculated using a distance (S) from a position where the last part of the object passes to the last point of the conveyor controlled by the control section and a rotational speed (V) of the motor that is rotated according to the motor driving signal.

4. The conveyor controller according to claim 2,
   wherein in a case where the output of the motor driving signal is stopped after the predetermined time (T) elapses, the control section transmits the progress signal to the non-PLC-based conveyor controller on the left side through the first controller connector, and in a case where the progress signal is received from the non-PLC-based conveyor controller on the left side, the control section outputs the motor driving signal through the output section.

5. The conveyor controller according to claim 1, wherein in a case where the object detection signal is continuously received for an object detection time corresponding to the maximum object length or longer through the input section after the progress signal is received from the first non-PLC-based conveyor controller on the left side through the first controller connector, or in a case where there is no output of the motor driving signal through the output section even after the detection time corresponding to the maximum object length elapses, the control section transmits a motor error message including its own serial number to the server through the internal communication section.

6. A non-PLC-based conveyor controller configured so that a plurality of the non-PLC-based conveyor controllers are connected in series to enable signal transmission between the controllers, comprising:
   a first controller connector that performs transmission and reception of data and an operation signal with respect to a non-PLC-based conveyor controller on a left side;
   a second controller connector that performs transmission and reception of data and an operation signal with respect to a non-PLC-based conveyor controller on a right side;
   an input section through which an object detection signal for an object transported on a conveyor is input from a sensor;
   an output section that outputs a motor driving signal for operating the conveyor;
   a control section that in a case where the object detection signal is input through the input section, transmits an entry prohibition signal to the non-PLC-based conveyor controller on the right side through the first controller connector, transmits a progress signal to the non-PLC-based conveyor controller on the right side through the second controller connector, and outputs the motor driving signal through the output section so that the object is transported to the conveyor controlled by the non-PLC-based conveyor controller on the right side; and
   a setting section that sets a serial number of each non-PLC-based conveyor controller, sets a movement direction of whether the controller moves the object to the left or right, and sets which one of a starting position, a middle position, and a last position of the plurality of controllers the position of the controller corresponds to,
   wherein in a case where the control section corresponds to a last controller through the settings of the setting section, and in a case where the object detection signal is received through the input section, the control section stops the output of the motor driving signal, and transmits the entry prohibition signal to the non PLC-based conveyor controller on the left side, and
   wherein in a case where the control section corresponds to a middle controller through the settings of the setting section, in a case where the entry prohibition signal is received from the last controller, and in a case where the object detection signal is received through the input section, the control section stops the output of the motor driving signal, and transmits the entry prohibition signal to the non-PLC-based conveyor controller on the left side.

* * * * *